United States Patent
Latib

[11] 3,722,935
[45] Mar. 27, 1973

[54] LOCKING DEVICES FOR VEHICLE VENT WINDOWS

[76] Inventor: Ismail Osman Latib, 383 Kerk Street, Transvaal, Republic of South Africa

[22] Filed: Mar. 24, 1971

[21] Appl. No.: 127,637

[30] Foreign Application Priority Data

Apr. 2, 1970 Republic of South Africa........2201

[52] U.S. Cl.................292/63, 292/DIG. 6, 292/112, 292/114, 292/288
[51] Int. Cl..............................................E05c 19/18
[58] Field of Search......292/67, 63, 288, 258, DIG. 6, 292/290, 292, 294, 295, 296, 114, 112

[56] References Cited

UNITED STATES PATENTS

| 2,168,677 | 8/1939 | McKeen | 292/DIG. 6 |
| 2,151,934 | 3/1939 | Parrott | 292/DIG. 6 |
| 554,317 | 2/1896 | Schwarz | 292/342 |
| 2,514,738 | 7/1950 | Bradley | 292/288 X |
| 2,719,745 | 10/1955 | Kent et al. | 292/112 |

Primary Examiner—Richard E. Moore
Attorney—Karl W. Flocks

[57] ABSTRACT

A vehicle vent window locking device adapted to be fitted to a vent window of a vehicle which has a window bar separating the vent window from an adjacent side window of the vehicle and which window bar has a side face directed towards the side window and a side window groove in the side face for the side window, the locking device including bolt means having a lip portion extending from its free end, the lip portion being adapted to be received in the side window groove and imprisoned therein by the side window. A vehicle vent window locking device adapted to be removably fitted to a vehicle vent window, and including bolt means to lock the vent window.

4 Claims, 5 Drawing Figures

Patented March 27, 1973 3,722,935
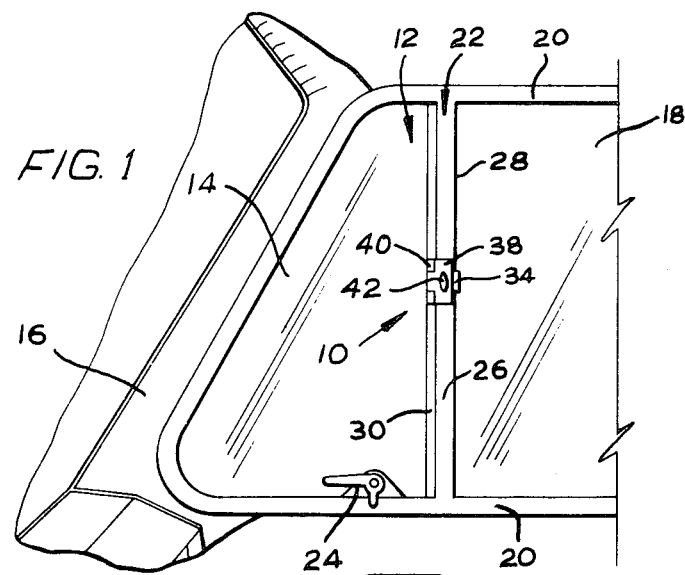
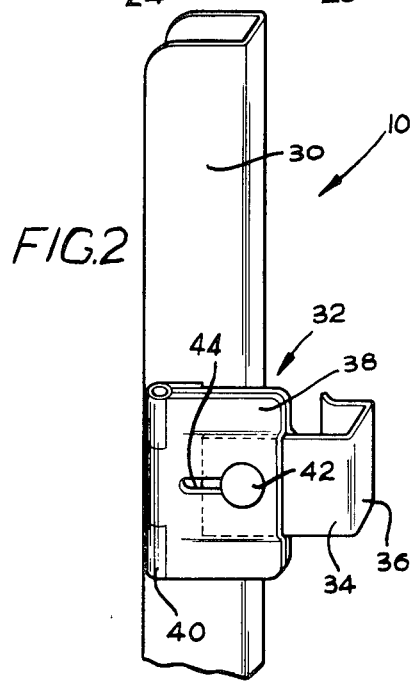
INVENTOR
ISMAIL OSMAN LATIB
BY KARL W. FLOCKS
ATTORNEY Patented March 27, 1973 3,722,935

LOCKING DEVICES FOR VEHICLE VENT WINDOWS

FIELD OF INVENTION

This invention relates to improvements in and relating to vehicle vent window locking devices.

SUMMARY OF THE INVENTION

According to the invention there is provided a vehicle vent window locking device adapted to be fitted to a vent window of a vehicle which has a window bar separating the vent window from an adjacent side window of the vehicle and which window bar has a side face directed towards the side window, the device including bolt means adapted to engage the side face of the window bar.

The locking device may be adapted to be removably fitted to a vent window.

Further according to the invention there is provided a vehicle vent window locking device adapted to be removably fitted to a vehicle vent window, and including bolt means to lock the vent window.

The bolt means may be adapted to lock the vent window by being adapted to engage a window bar of the vehicle which separates the vent window from an adjacent side window of the vehicle. Alternatively, the bolt means may be adapted to lock the vent window by being adapted to engage portion of the vehicle defining a frame for the vent window.

The locking device may include holding means to hold the bolt means in any position between its operative and inoperative positions. The holding means may comprise spring means bearing on the bolt means.

The locking device may include a bolt housing having a slot within which the bolt means is slidably located, the bolt means being adapted to be slidably displaced towards and away from its operative position.

The bolt means may, in an embodiment of the invention, be of substantially U-shape with the limbs of the U-shaped bolt means being biassed outwardly into contact with the walls defining the slot of the bolt housing to thereby locate the bolt means relatively to the housing.

In an embodiment of the invention the bolt means may comprise an abutment plate adapted to abut an inside face of the window bar which is directed towards the interior of the vehicle, and a lip portion extending from the free end of the abutment plate and adapted to engage the window bar side face which is directed towards the side window.

The locking device may have the abutment plate pivotally connected thereto.

The locking device may include a bolt housing to which the abutment plate is slidably connected, thereby allowing the abutment plate to be slidably displaced into and out of its operative position. In this case the locking device may include displacement means for slidably displacing the abutment plate relatively to the bolt housing.

The lip portion may be shaped to be at least partly receivable in a side window groove for the side window in the side face of the window bar. The lip portion may conveniently be adapted to be imprisoned in the side window groove by the side window.

The locking device may be adapted to be fitted to the vent window by including a substantially channel section support member for receiving a peripheral portion of the vent window.

The invention further extends to a vent window having a locking device as described, fitted thereto, and to a vehicle having such a vent window.

BRIEF DESCRIPTION OF THE DRAWINGS

The invention is now described by way of example with reference to the accompanying drawings.

In the drawings:

FIG. 1 is a fragmentary view from the interior of a vehicle showing a vent window, a side window and a vent window locking device in its operative position.

FIGS. 2 and 3 shows fragmentary three-dimensional views to an enlarged scale, of alternative embodiments of the locking device illustrated in FIG. 1.

FIGS. 4 and 5 shows fragmentary three-dimensional views to an enlarged scale of further alternative embodiments of vehicle vent window locking devices.

Figures 3, 4, 5:
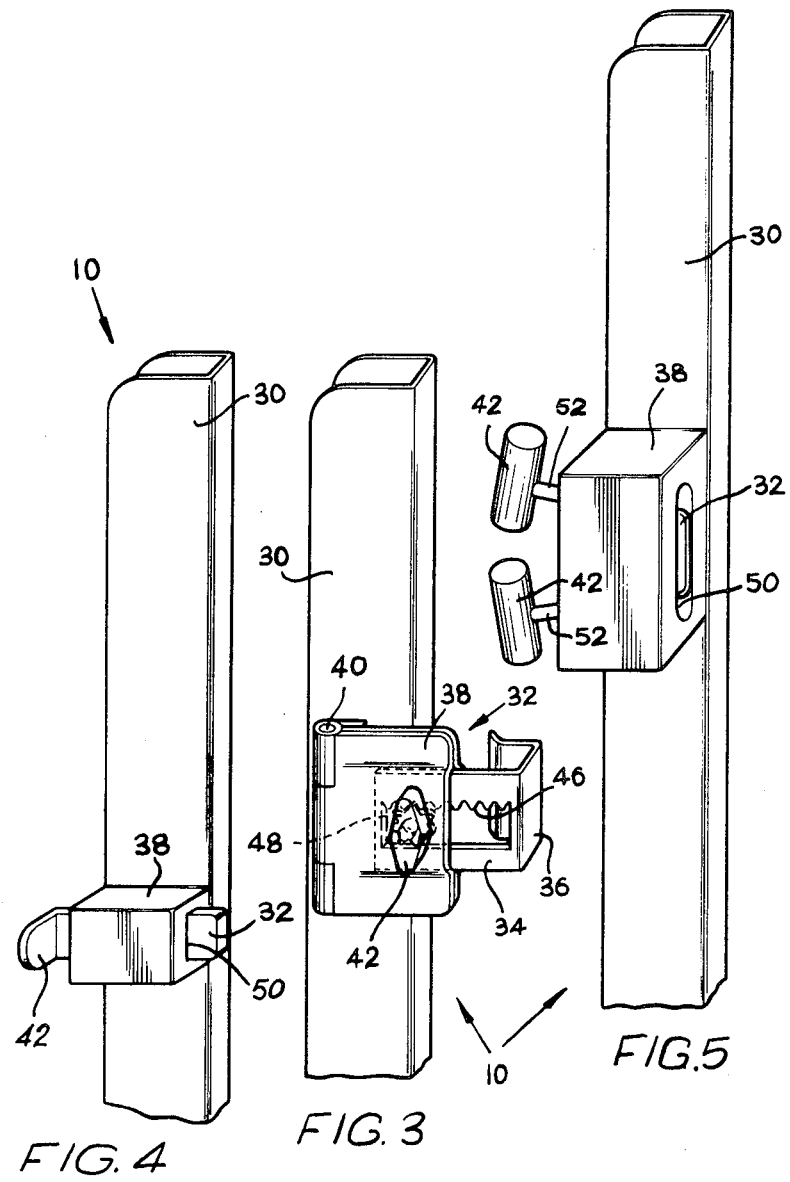

DESCRIPTION OF PREFERRED EMBODIMENTS.

With reference to FIG. 1 of the drawings, reference numeral 10 refers generally to a vehicle vent window locking device fitted to the trailing edge 12 of a vent window 14 of a vehicle 16.

The vehicle 16 has a side window 18 adjacent the vent window 14 and has a frame 20 for the vent window 14 and side window 18.

The vehicle 16 further has a window bar 22 separating the vent window 14 and side window 18, and the vent window 14 has a conventional type of catch 24 fixed thereto.

The window bar 22 has an inside face 26 directed towards the interior of the vehicle 16, and has a side face 28 directed towards the side window 18. The side face 28 has a side window groove (not shown) for the side window 18.

The locking device 10 shown in FIG. 1 of the drawings is now described with particular reference to FIGS. 2 and 3 of the drawings.

The locking device 10 includes a channel section support member 30 for receiving the trailing edge 12 of the vent window 14 to thereby locate the locking device 10 on the vent window 14.

The channel section support member 30 may be adapted to provide a friction fit with the trailing edge 12 of the vent window 14. Additionally, or alternatively, the support member 30 may be secured to the vent window 14 by means of an adhesive, by means of securing screws (not shown) provided along the support member 30 to engage the vent window 14, or the like.

The channel section support member 30 may further include insulating material to insulate the member 30 from the vent window 14.

The locking device 10 includes bolt means 32 mounted on the support member 30, to engage the window bar 22 for locking the vent window.

The bolt means 32 comprises an abutment plate 34 to abut the inside face 26, and a lip portion 36 extending from the free edge of the abutment plate 34 to engage the side face 28 of the window bar 22.

The lip portion 36 is shaped to be snugly receivable in the side window groove of the window bar 22 when the side window 18 is opened sufficiently. Thus when the side window 18 is closed, it will tend to imprison the lip portion 36 in the side window groove of the window bar 22.

The locking device 10 includes a bolt housing 38 having a slot within which the abutment plate 34 is slidably located.

The bolt housing 38 is pivotally mounted on the support member 30 by means of a hinge 40.

The abutment plate 34 is adapted to be slidably extended out of or retracted into the bolt housing 38 during displacement of the locking device 10 relatively to its operative and inoperative positions.

The locking device 10 includes displacement means 42 for slidably displacing the abutment plate 34 relatively to the bolt housing 38.

In FIG. 2 of the drawings the displacement means 42 comprises a knob connected to the abutment plate 34 and extending slidably through a slit 44 in the bolt housing 38.

In FIG. 3 of the drawings the displacement means 42 comprises ratchet means 46 provided in the abutment plate 34, and pinion means 48 rotatably mounted on the bolt housing 38 to cooperate with the ratchet means 46. The pinion means 48 has a knob projecting from the bolt housing 38 for rotating the pinion means 48.

The locking device 10 includes bias means (not shown) to bias the bolt housing 38 away from the support member 30; and holding means (not shown) to hold the abutment plate 34 in any position relative to the bolt housing 38.

In use, when it is desired to lock the vent window 14, the vent window is displaced into its closed position. The side window 18 is then opened and the abutment plate 34 is displaced to fit the lip portion 36 into the side window groove. Thereafter the side window 18 is closed to imprison the lip portion 36 in the side window groove.

It will further be noted that when the vent window 14 is in its closed position, the support member 30 is sandwiched between the vent window 14 and the window bar 22 thereby further serving to locate the locking device 10 against forced entry.

With reference to FIGS. 4 and 5 of the drawings where like parts are indicated by like reference numerals to those of FIGS. 1, 2 and 3, the locking device 10 includes bolt means 32 adapted to abut the inside face 26 of the window bar 22 to lock the vent window 14.

The locking device 10 includes a bolt housing 38 integrally mounted on the channel section support member 30, and having a slot 50 within which the bolt means 32 is slidably located.

In FIG. 4 of the drawings the bolt means 32 is adapted to be slidably displaced into and out of its operative position where it abuts the inside face 26 of the window bar 22. The locking device includes holding means (not shown) to hold the bolt means in any position relatively to the bolt housing 38.

The bolt means 32 has displacement means 42 for use in displacing the bolt means 32.

In FIG. 5 of the drawings, the bolt means 32 is of substantially U-shape with the limbs of the U-shaped bolt means 32 being biassed outwardly into contact with the walls defining the slot 50, thereby locating the bolt means 32 relatively to the bolt housing.

The bolt means 32 has displacement means 42 fitted onto the limbs 52 for displacing the bolt means 32. When the displacement means 42 are squeezed towards each other the limbs 52 are displaced away from the walls defining the slot 50 thereby allowing the bolt means 32 to be displaced.

I claim:

1. A vent window locking device for a pivotally mounted vent window of a vehicle having a window bar separating the trailing edge of the vent window from an adjacent slidably mounted side window, the window bar having a side window groove along which the side window is slidable, the locking device including support means attachable to the vent window, displaceable bolt means extending from the support means, and a hook formation extending from the bolt means, the hook formation having an engagement portion extending at least partly in the direction of the support means, the engagement portion being adapted to be engaged with the side window groove to lock the vent window when the bolt means is displaced into its locking position, and being adapted to be disengaged from the groove when displacing the bolt means into its unlocking position.

2. A vent window locking device according to claim 1, in which the engagement portion has a transversely directed locating tip at least partially receivable between the bottom of the side window groove and the edge of the side window when the engagement portion is engaged with the side window groove, the edge of the side window being slidably displaceable over said locating lip.

3. A vent window locking device according to claim 1, in which the support means is of channel section to define a groove for accommodating and engaging with the trailing edge of the vent window.

4. A vent window locking device according to claim 1, including a bolt housing within which the bolt means is slidably mounted, the bolt housing being pivotally connected to the support means about a pivot axis to allow the bolt housing to swing clear of the window bar for opening the vent window.

* * * * *